US005613268A

United States Patent [19]
Scorsiroli

[11] Patent Number: 5,613,268
[45] Date of Patent: Mar. 25, 1997

[54] WINDSHIELD WIPER ARM FOR VEHICLES

[75] Inventor: Marcello Scorsiroli, Turin, Italy

[73] Assignee: Cooper Industries, Inc., Houston, Tex.

[21] Appl. No.: 592,528

[22] Filed: Jan. 26, 1996

[30] Foreign Application Priority Data

Jan. 27, 1995 [IT] Italy ................................. T095A0054

[51] Int. Cl.⁶ .................................. B60S 1/34; B60S 1/32
[52] U.S. Cl. ................................ 15/250.352; 15/250.351; 15/250.34
[58] Field of Search ..................... 15/250.351, 250.352, 15/250.34, 250.202, 250.21, 250.31

[56] References Cited

U.S. PATENT DOCUMENTS

| 2,226,358 | 12/1940 | Sibley | 15/250.352 |
|---|---|---|---|
| 2,838,782 | 6/1958 | Wallis | 15/250.352 |
| 2,964,774 | 12/1960 | Bolles et al. | 15/250.34 |
| 3,076,992 | 2/1963 | Reese | 15/250.352 |
| 3,344,458 | 10/1967 | Deibel | 15/250.352 |
| 3,387,316 | 6/1968 | Pearse | 15/250.351 |
| 3,480,985 | 12/1969 | Forster | 15/250.352 |
| 5,084,933 | 2/1992 | Buechele | 15/250.32 |

FOREIGN PATENT DOCUMENTS

| 210420 | 4/1987 | European Pat. Off. . | |
|---|---|---|---|
| 1183874 | 7/1959 | France . | |
| 2382357 | 9/1978 | France . | |
| 2808596 | 9/1978 | Germany | 15/250.34 |
| 9205052 | 4/1992 | WIPO . | |

Primary Examiner—Gary K. Graham
Attorney, Agent, or Firm—Fish & Richardson P.C.

[57] ABSTRACT

A windshield wiper arm for a vehicle windshield includes a block; a blade supporting arm having a first end and a second end, the first end of the blade supporting arm connected to the block so as to permit oscillation in a direction orthogonal to the windshield; the second end including a device for attaching the blade supporting arm to a windshield wiper; a device for imparting an elastic load between the block and the blade supporting arm so as to urge the windshield wiper against the windshield; the block including a cavity therein for receiving the first end of the blade supporting arm; and the imparting device arranged to impart the load on the first end of the blade.

9 Claims, 4 Drawing Sheets

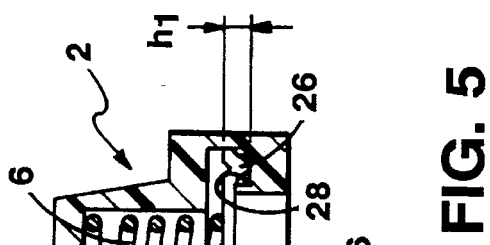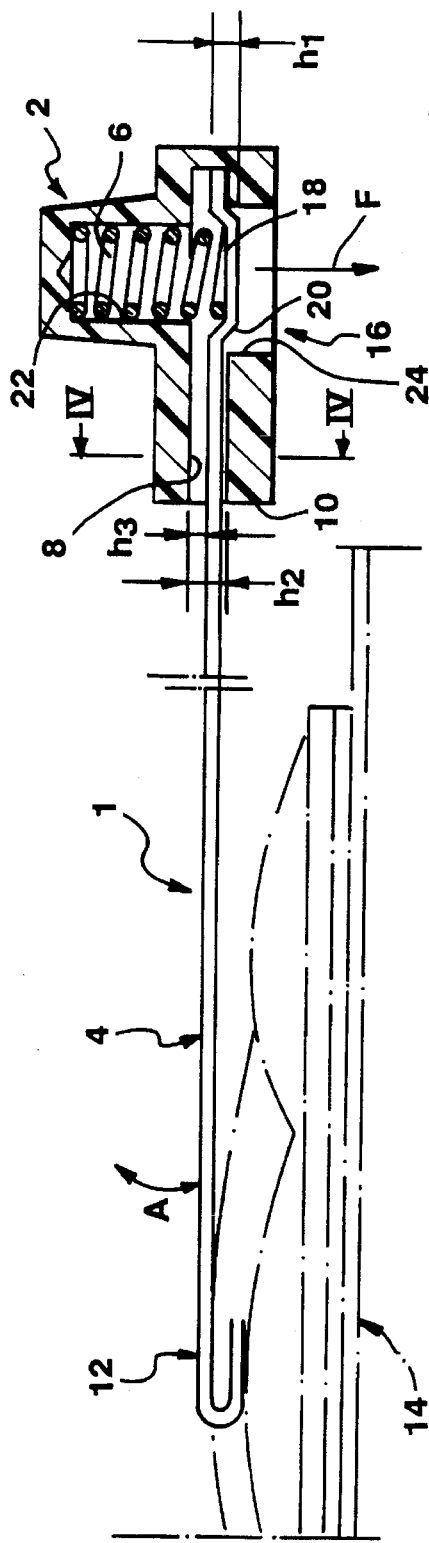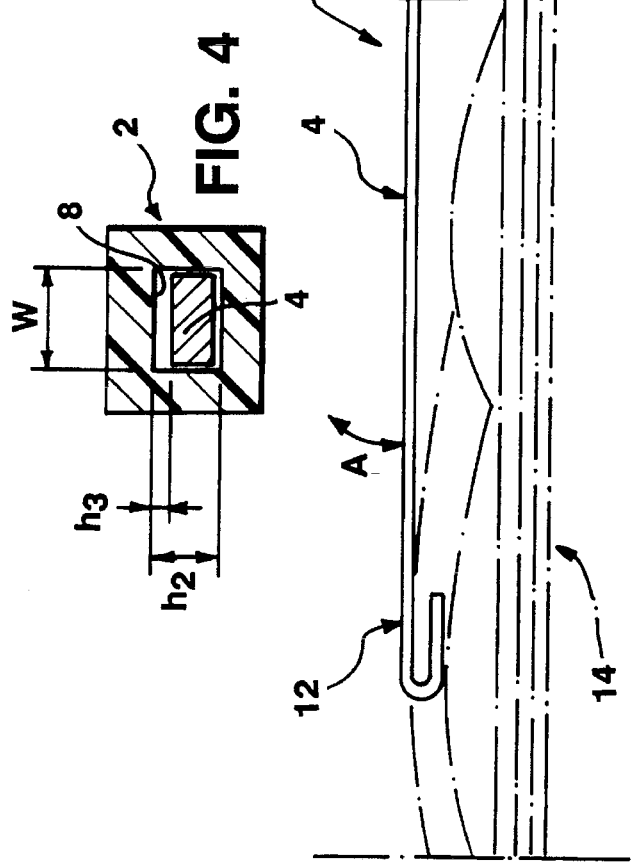

WINDSHIELD WIPER ARM FOR VEHICLES

BACKGROUND OF THE INVENTION

1. Field of the Invention

The present invention relates to a windshield wiper arm for vehicles.

2. Description of Related Art

Windshield wiper arms of a known type for vehicles generally include the following fundamental components:

- a block to fasten the wiper arm to a system for oscillatory input
- a lengthened element to hold the blade, supported by the block in a way to allow for oscillation essentially orthogonal to the windshield and provided with means to attach a wiper blade at its far extremity, and
- elastic means, located between the block and the blade carrying element, used to subject this element to an elastic load which during use tends to maintain the blade pressed against the vehicle's windshield.

In practical assemblies, the wiper arms available on the market in general include nine or more distinct parts which, when assembled, form the fundamental elements listed above.

The blade carrying element of the conventional windshield wiper arms include a shaft riveted to a channel shaped element, which pivots about the block. Between the block and the blade element is a helical spring which can be either in tension or compression. In either case, pins, rivets or additional elements are needed to fasten the extremities of the spring. The assembly of the various pieces (shaft, channel, rivets, pins, spring, etc.) forming a traditional wiper arm is a quite involved operation that does not lend itself easily to complete automation.

OBJECTS AND SUMMARY

The present invention is aimed at furnishing a simple and economic wiper arm, comprising the least possible number of parts, and which lends itself to automatic assembly.

The wiper arm, according to the present invention, includes a unique combination of three components: a block, a lengthened blade carrying element which is preferably formed by a shaft with a rectangular cross section, and an elastic element that imposes the elastic force on the blade element which during use presses the blade against the windshield.

According to a preferred embodiment, the elastic element also secures the shaft to the block, since it imparts a force that tends to maintain the striking surfaces (found on the block and the shaft) engaged to each other. The assembly of these elements can be easily accomplished by full automation with relatively simple machines.

BRIEF DESCRIPTION OF THE DRAWINGS

Other characteristics and advantages of the invention will become apparent in the following detailed description, given solely as a nonlimiting illustrative example, with references to the attached drawings, in which:

FIG. 3 is a schematic section per line II—II of FIG. 1;

FIG. 4 is a section per line IV—IV on FIG. 3;

FIG. 5 is a schematic section analogous to the one of FIG. 3, showing a different construction of the arm according to the present invention.

DETAILED DESCRIPTION OF THE PREFERRED EMBODIMENTS

Figure 1:
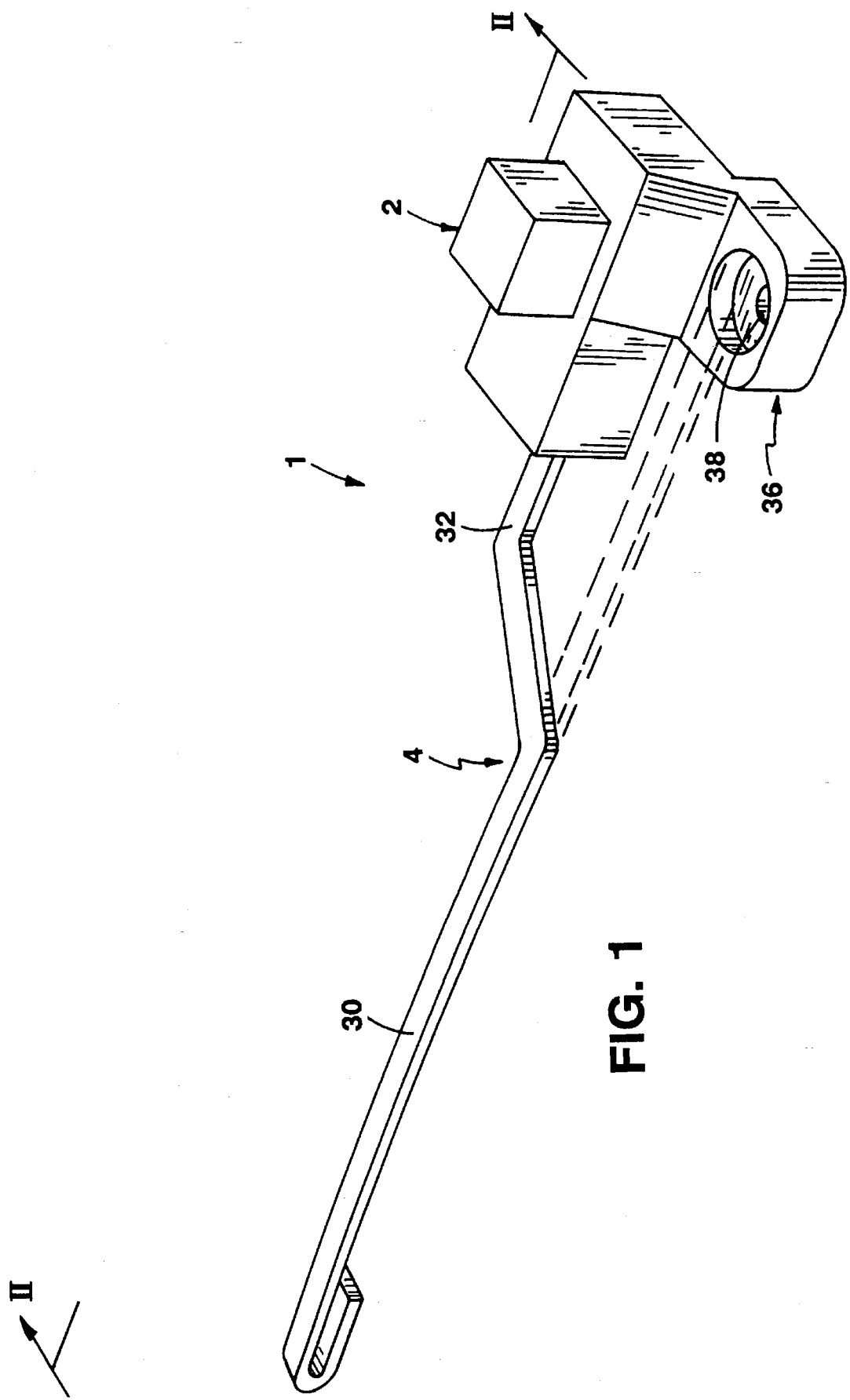
FIG. 1 is a perspective schematic view of a wiper arm according to the present invention.
Figure 2:
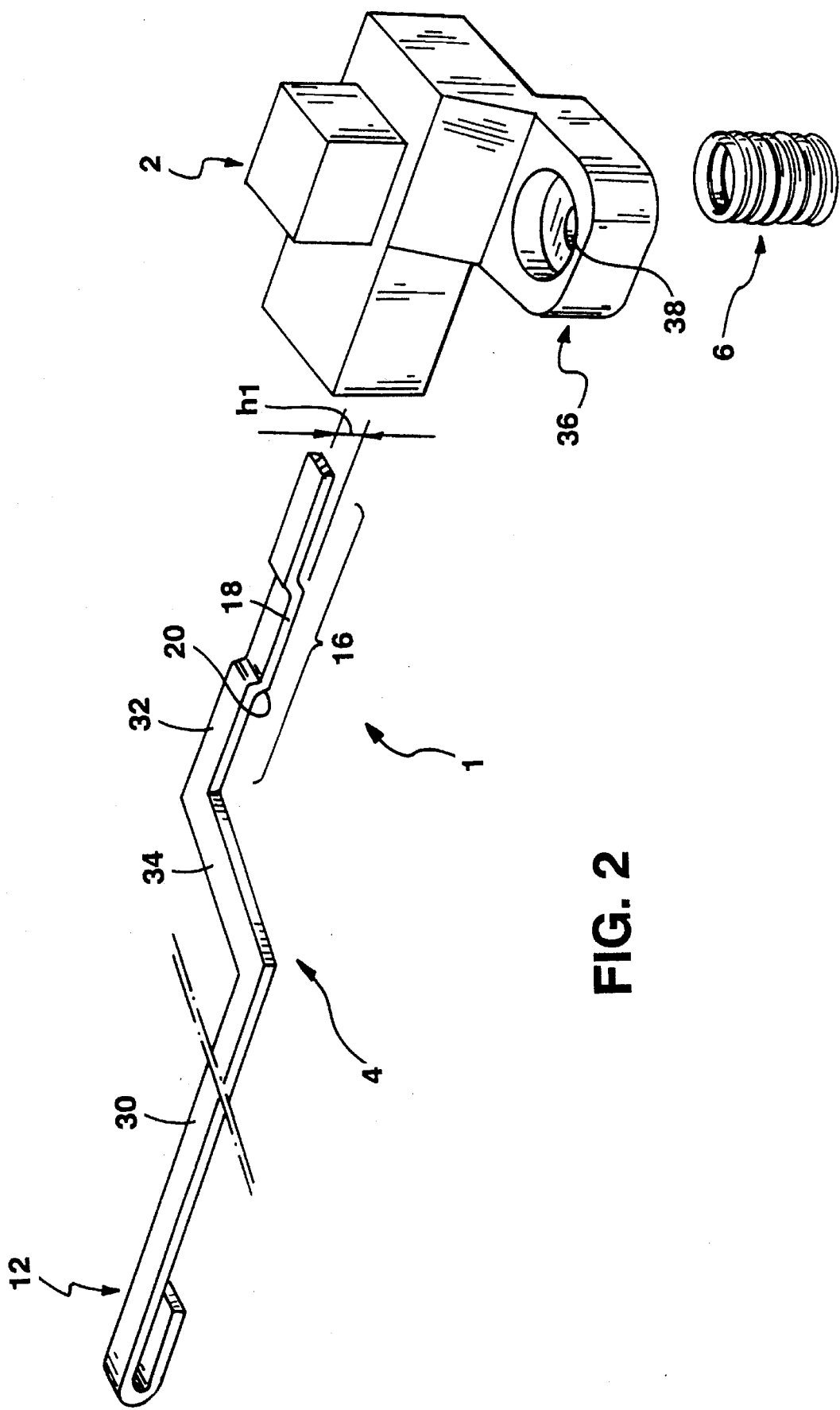
FIG. 2 is a perspective exploded view of the arm of FIG. 1.
Figure 6:
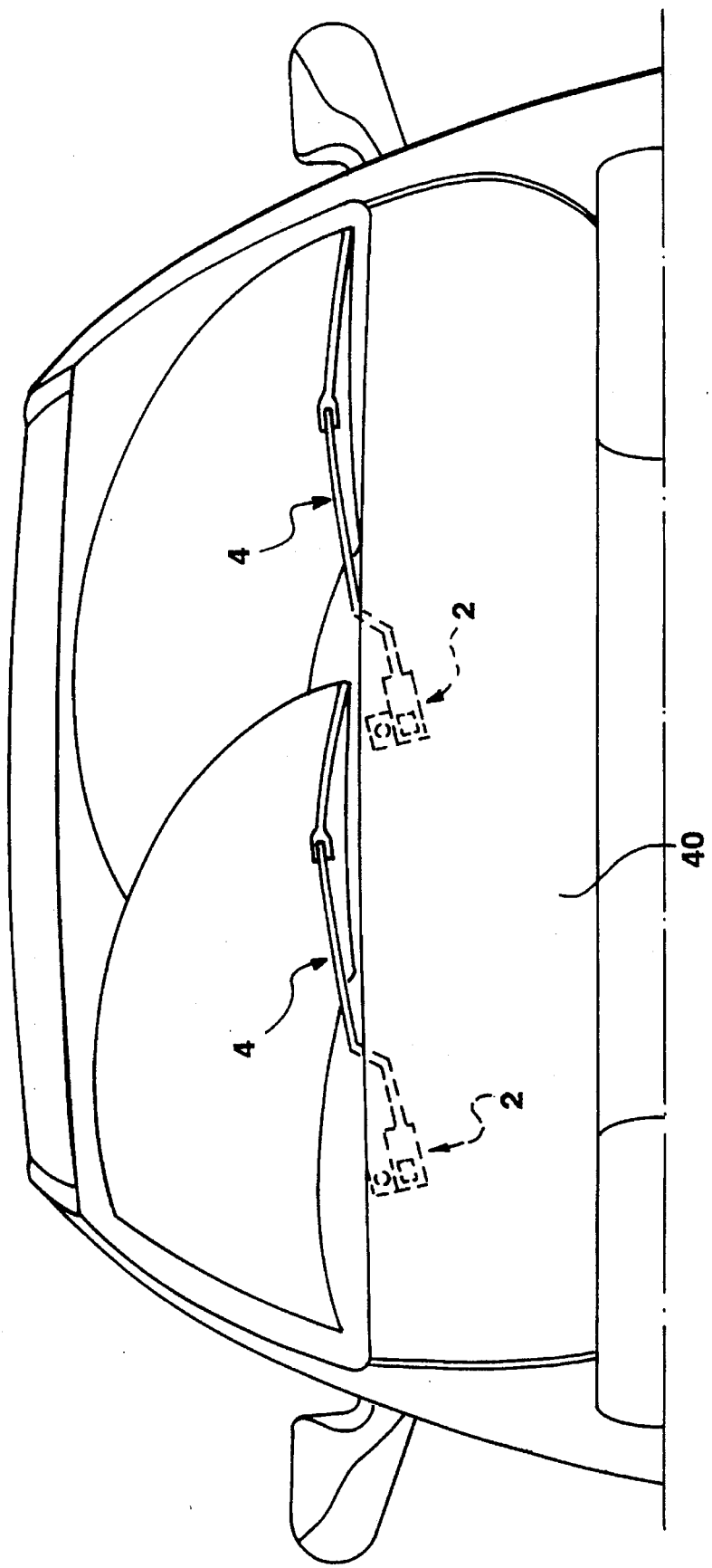
FIG. 6 is a front view of a vehicle equipped with a wiper arm according to the present invention.

In reference to FIGS. 1 and 2, a wiper arm (1) is disclosed. In its simpler form, the wiper arm (1) comprises three parts: a block (2), a lengthened blade carrying element (4), and an elastic element (6).

Block (2) is of one piece and it is made of either metal, for example aluminum, or an alloy thereof, or plastic, possibly fiber reinforced.

Referring to FIGS. 3, 4 and 5, inside block (2) there is a cavity (8) that reaches the outside (10) of the block.

Referring to FIG. 2, in a preferred form of the invention, the blade carrying element (4) comprises a shaft (preferably steel) with a rectangular cross section. Shaft (4) could be of shapes different from the one shown as an illustrative example in the figure: it could have a square, round or polygonal cross section. The distal end of the blade carrying element (4) is U-shaped, such that it forms a standard type attachment (12) for fastening a wiper blade, shown as a broken line and labeled 14 on FIGS. 3 and 5.

As illustrated in FIGS. 2, 3 and 5, the other end of shaft (4) makes up a portion of connection (16) which is inserted into the cavity (8) of the block (2). The shaft's (4) portion of the connection (16) includes a stepped portion (18) with a striking surface (20). The total height of step (18) is labeled h1. The height of cavity (8) is labeled h2 in FIGS. 3 and 4 and it must be slightly greater than height (h1) to allow the insertion of the connecting portion (16) into cavity (8). Therefore, between shaft (4) and cavity (8) there is some slack, indicated by (h3) in FIGS. 3 and 4 which allows shaft (4) to oscillate in the direction indicated by the double arrow (A) in FIG. 3.

As shown in FIG. 4, the width (W) of the cavity (8) is essentially the same as the width of shaft (4).

In reference to FIG. 3, inside block (2) there is another cavity (22) which intersects the cavity (8). In the example shown in the figures, this is a 90 degree intersection, but in other variations of the design, the cavity (22) and cavity (8) can intersect at different angles. An elastic element (6) is located inside the cavity (22). In the present embodiment, the elastic element (6) is a helical spring in compression. Other forms of an elastic element (6) can be employed, such as a flat spring, Belleville spring or others.

Elastic element (6) applies a force (F) on the connecting portion (16) of shaft (4) that is orthogonal to the longitudinal axis of shaft (4). The direction of force (F) is, therefore, parallel to the direction of oscillatory motion (A) of shaft (4). It is necessary to point out that this invention includes also solutions in which the direction of force (F) is inclined by some degree with respect to the direction shown on FIG. 3. For example, if the direction of elastic element (6) was at an angle of 30 or 40 degrees in either direction with respect to the one shown on FIG. 3, the results intended by this invention would still be achieved.

An important feature is that force (F) of the elastic element or spring (6) acts on connecting portion (16) of shaft (4).

The force of spring (6) is calculated such that it produces the necessary force at the end (12) of shaft (4) to press the blade (14) against the windshield of the vehicle. Slack (h3) permits raising the blade for cleaning the windshield with a rag or by other means.

Compared to conventional windshield wiper arms where the blade carrying element is pivoted about the block, the arm in this invention allows a more limited raising motion of the blade. However, this is not necessarily a disadvantage and on the contrary, it is an advantage when the wiper arms are mounted under the hood. In fact, in this case the blade carrying element has to have a limited raising motion to avoid interference with the hood.

The elastic element (6), other than generating the force necessary for the proper operation of windshield wiper (14), also secures the blade carrying element (4) inside the cavity (8) of the block (2). In fact, as shown in FIG. 3, the force (F) produced by the elastic element (6) maintains the connecting portion (16) of the shaft (4) in a position in which the striking surface (20) of the step (18) interferes with the striking surface (24) of the block (2). This prevents the shaft (4) from coming loose in the direction of its own axis.

Assembly of the wiper arm according to the present invention is accomplished by compressing the spring (6) and simultaneously inserting the shaft's connecting portion (16) into the cavity (8), starting from the open end of the cavity. Compression of spring (6) can be accomplished by a fork-shaped tool that allows the connecting portion (16) to go through the two arms of the fork. The sequence of assembly operations does not require riveting, pivots, etc., as is the case for wiper arms of known types and, therefore, it can be automated with relatively simple machines.

FIG. 5 illustrates a variation in which the step (18) of shaft (4) is composed of two indents (26) that are inserted into respective holes (28) in the block (2). In this case, the striking surfaces, that prevent the shaft (4) from coming out, include the lateral surfaces of the indents (26) and the holes (28). This solution allows a reduction of height (h2) in the cavity (8), which in turn reduces play (h3).

Going back to FIGS. 1 and 2, following a preferred design of a wiper arm per this invention, the shaft (4) may be Z-shaped, with two straight portions (30) and (32) extending respectively into the attachment portion (12) and the connecting portion (16) and which are connected by an oblique portion (34). The block (2) has a protuberance (36) which is separate with respect to the cavity (8) which accepts the connecting portion (16) and has a mounting hole (38) for its fastening to the generator of oscillatory motion provided on the vehicle. The mounting hole (38) of the block (2) is aligned with the extension of the straight portion (30) with the attachment portion (12), as shown in FIG. 1.

In reference to FIG. 5, this configuration is particularly advantageous for vehicles equipped with a defined space between the upper edge of the hood (40) and the base of the windshield. In fact this space can be utilized to house the block (2) of the wiper arm so that it is hidden under the hood. This configuration is advantageous from a point of view of aesthetics and aerodynamics, since it reduces the visual and aerodynamic impact of the windshield wiper arm. However, this configuration should be considered as a preferred embodiment that does not limit the extent of the invention, since the shaft (4) could be straight or could be differently shaped, not necessarily in the Z-shape as illustrated as an example.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A windshield wiper arm for a vehicle windshield, comprising:

a block;

a blade supporting arm having a first end and a second end, said first end of the blade supporting arm connected to said block so as to permit oscillation in a direction orthogonal to said windshield;

said second end including means for attaching the blade supporting arm to a windshield wiper;

means for imparting an elastic load between said block and said blade supporting arm so as to urge the windshield wiper against the windshield when the blade supporting arm is attached to the windshield wiper;

said block including a first elongated cavity therein receiving the first end of the blade supporting arm and a second elongated cavity therein for receiving said imparting means, said second cavity intersecting said first cavity; and said imparting means received in said second cavity and positioned between an interior surface of said second cavity and said blade supporting arm to impart the load on the first end of the blade supporting arm.

2. The windshield wiper arm of claim 1, wherein the first cavity receives the first end with play.

3. The windshield wiper arm of claim 1, wherein the imparting means exerts a compressive force on the first end in the first cavity.

4. The windshield wiper arm according to claim 1, wherein the load produced by the imparting means is parallel to a direction of oscillation of the blade supporting arm with respect to the block.

5. The windshield wiper arm according to claim 1, wherein the blade supporting arm and the block both have respective striking surfaces and the imparting means imparts a force that tends to maintain the blade supporting arm and the block in a position in which the striking surfaces cooperate to keep the blade supporting arm in the block.

6. The windshield wiper arm according to claim 1, wherein the imparting means includes at least a helical spring in compression seated in the second cavity of the block and is extended perpendicularly to a portion of the second cavity that receives the first end of a blade supporting arm.

7. The windshield wiper arm according to claim 1, wherein the blade supporting arm is formed by a shaft with a rectangular cross section.

8. The windshield wiper arm according to claim 7, wherein the shaft forming the blade supporting arm is Z-shaped with two portions parallel to each other: one having the first end and the other the second end.

9. The windshield wiper arm according to claim 8, wherein the block has a hole for fastening to a driving shaft, wherein the hole is spaced from the portion of the shaft that has the first end, and the hole is also located in alignment with the second end.

* * * * *